United States Patent [19]

Sakaue et al.

[11] Patent Number: 5,140,854
[45] Date of Patent: Aug. 25, 1992

[54] INTAKE AIR QUANTITY MEASURING APPARATUS

[75] Inventors: Yasunori Sakaue, Nagoya; Shinichi Sakakibara, Handa; Mamoru Matsubara, Toyoake, all of Japan

[73] Assignee: Aisan Kogyo Kabushiki Kaisha, Obu, Japan

[21] Appl. No.: 691,825

[22] Filed: Apr. 26, 1991

Related U.S. Application Data

[62] Division of Ser. No. 500,190, Mar. 28, 1990, Pat. No. 5,060,511.

Foreign Application Priority Data

| Mar. 31, 1989 | [JP] | Japan | 1-83822 |
| Mar. 31, 1989 | [JP] | Japan | 1-83823 |
| Mar. 31, 1989 | [JP] | Japan | 1-83824 |

[51] Int. Cl.⁵ .............................. G01F 1/68
[52] U.S. Cl. .............................. 73/204.26
[58] Field of Search ........... 73/204.23, 204.25, 204.26, 73/204.27

[56] References Cited

U.S. PATENT DOCUMENTS

| 3,996,799 | 12/1976 | Van Putten | |
| 4,449,402 | 5/1984 | Eiermann et al. | 73/204.26 |
| 4,478,076 | 10/1984 | Bohrer | 73/204.26 X |
| 4,635,475 | 1/1987 | Jones et al. | 73/204.26 |
| 4,682,503 | 7/1987 | Higashi et al. | 73/204.26 X |
| 4,691,566 | 9/1987 | Aine | 73/204.27 |
| 4,843,882 | 7/1989 | Ohta | 73/204.26 |

FOREIGN PATENT DOCUMENTS

| 57-201858 | 12/1982 | Japan . |
| 59-151020 | 8/1984 | Japan . |
| 60-230019 | 11/1985 | Japan . |
| 60-236029 | 11/1985 | Japan . |
| 60-183825 | 12/1985 | Japan . |
| 63-195229 | 12/1988 | Japan . |

Primary Examiner—Herbert Goldstein
Attorney, Agent, or Firm—Burns, Doane, Swecker & Mathis

[57] ABSTRACT

An arrangement for measuring a quantity of intake air passing through an intake air duct by a sensing element disposed in parallel with a flow direction of the intake air. The sensing element includes a flow speed sensing resistor deposited on a base plate and formed into a film for sensing a flow speed of the intake air, and a pair of lead members deposited on the base plate and electrically connected to the resistor. The flow speed sensing resistor is arranged to form a temperature distribution of the resistor uniform in a direction parallel with and/or perpendicular to the flow direction of the intake air.

1 Claim, 6 Drawing Sheets

INTAKE AIR QUANTITY MEASURING APPARATUS

This application is a divisional of application Ser. No. 500.190. filed Mar. 28, 1990 now U.S. Pat. No. 5.060.511.

BACKGROUND OF THE INVENTION

1. Field of the Invention

The present invention relates to an intake air quantity measuring apparatus, and more particularly to an apparatus for measuring a quantity of the intake air which flows into an intake air duct of an internal combustion engine.

2. Description of the Related Art

For measuring a quantity of the intake air supplied to an internal combustion engine, various air quantity measuring apparatuses have been employed. In the prior apparatuses, an intake air temperature sensing element and a flow speed sensing element are disposed in an intake air duct with the planes of the elements parallel to the flow of the intake air, as disclosed in Japanese Patent Laid-Open Publication No. 60-230019 for example. Both elements comprise heat sensing resistors which form a bridge circuit with fixed resistors. In parallel with the flow speed sensing element, there is provided a heating resistor which heats up the heat sensing resistor of the flow speed sensing element to a higher temperature than that of the intake air temperature sensing element by a predetermined temperature difference. Then, the heating current supplied to the heating resistor is regulated in response to the temperature of the heat sensing resistor of the flow speed sensing element, which temperature is changed in response to the quantity of heat transferred to the intake air, so as to maintain the predetermined temperature difference. Consequently, the flow speed of the intake air is measured through the heating current, and the quantity of the intake air is determined by the flow speed.

The above-described intake air quantity measuring apparatus is of a so-called indirect heating type. Further, in Japanese Utility Model Laid-Open Publication No. 60-183825, there is disclosed an apparatus having an element forming all the resistors including the heating resistor with a thin film resistor An apparatus of a so-called self-heating type is also known, as disclosed in Japanese Patent Laid-Open Publication No. 57-201858 in which the flow speed sensing element is provided with a cantilever base plate having a thin film resistor deposited thereon. Further, in Japanese Patent Laid-Open Publication No. 60-236029, there is disclosed another self-heating air quantity measuring apparatus which is provided with a base plate having the film resistor deposited thereon both ends of which are fixed to the intake duct. In this publication, it is proposed that the ohmic value of the film resistor at the upstream in the intake air duct is set larger than that at the downstream so that the quantity of heat generated at the upstream is more than the quantity of heat at the downstream, whereby a temperature distribution of the film resistor is made uniform.

With respect to the speed sensing element in the air quantity measuring apparatus, the temperature of the element must be changed in response to the flow speed of the intake air. Therefore, if the speed sensing element itself or other factors relating thereto affects the above-described temperature change, it is difficult to measure the quantity of the intake air accurately. Therefore, any of the base plates of the flow speed sensing elements in the above-described publications is made into a thin flat plate which is disposed in parallel with the air flow of the intake air.

In the air quantity measuring apparatus as described above, the quantity of heat generated by the flow speed sensing element is transferred to the air surrounding it or to a portion of the intake air duct to which the base plate is fixed. In the case where the flow speed of the intake air is high, almost all the quantity of heat is transferred to the surrounding air. On the contrary, in the case where the flow speed of the intake air is low, the quantity of heat transferred to the surrounding air is reduced, whereas the quantity of heat transferred to the portion of the base plate fixed to the intake air duct is increased relatively. Since this quantity of heat transferred to the portion of the base plate fixed to the intake air duct is changed depending upon the temperature of the intake air or that of the intake air duct, the current fed to the abovedescribed bridge circuit is changed, so that the accuracy of sensing the flow speed of the intake air is deteriorated. In Japanese Patent Laid-Open Publication No. 59-151020, therefore, proposed is a lead member connected to a heat sensing resistor having a length of a ratio to a diameter of the lead member more than a predetermined ratio. In the Japanese Patent Laid-Open Publication No. 57-201858, it is proposed that the base plate is formed thin and made from a material of low heat conductivity so that the heat transfer is blocked from a portion of the base plate where a film resistor is deposited to a portion where the base plate is fixed.

As described in the above publications, various countermeasures in structure or arrangement of the components of the speed sensing element including resistors are taken in view of the temperature distribution of the thin film resistor in the direction of the intake air, or its temperature distribution based upon the heat transfer from the sensing resistors to the base plate, the lead members and etc.. FIGS. 14 to 16 show a sensing element 100 which is used for an air quantity measuring apparatus proposed in the Japanese Patent Application No. 63-226900 filed by one of the applicants of this application but not disclosed to the public. The sensing element 100 has a base plate 110 formed with a slit 110a, on each side of which there are deposited an intake air temperature sensing resistor 120, a flow speed sensing resistor 130 and a pair of lead members 140, 150 extending from the resistors 120, 130 respectively toward the base end of the base plate 110 as shown in FIG. 14, where a broad arrow indicates the flow direction of the intake air to be measured. According to the sensing element 100, since the flow speed sensing resistor 130 is formed in a letter "U", the size of the flow speed sensing resistor 130, or the width thereof is reduced comparing with the prior resistors formed in series of a letter "S", so that a better temperature distribution of the flow speed sensing resistor 130 is obtained.

However, in the sensing element 100, the temperature distribution on the base plate 110 is made as shown in FIGS. 14 and 15, wherein one-dotted chain lines indicate the temperature of the intake air with the left side in FIG. 14 and the upper side in FIG. 15 set to be higher side in temperature, and solid lines indicate the temperature of a portion of the base plate 110 on which the flow sensing resistor 130 is deposited, and wherein the latter temperature is reduced gradually at the end portions of the base plate 110 in both lateral and longitudinal directions thereof. Therefore, it is necessary to provide some means for compensating the reduction of the temperature at the end portions. Especially, as shown at the right side in FIG. 16, when the flow speed of the intake air is high and the quantity of the intake air is large, the coefficient of the heat transfer to the intake air is large, so that the temperature distribution of the flow speed sensing resistor 130 is made as indicated by "Ho" in FIG. 16. In this FIG. 16, the temperature of the resistor 130 at its downstream side closing to the intake air is reduced rapidly, whereas the temperature at its opposite side is reduced gradually. On the contrary, when the flow speed of the intake air is low and the quantity of the intake air is small, the temperature distribution is made as indicated by "Lo" shown in FIG. 16, where the one-dotted chain line extending vertically indicates the temperature of the intake air with the left side in FIG. 16 set to be higher side in temperature. Since the total quantity of heat transferred from the flow speed sensing resistor 130 is determined by the temperature distribution thereof, a change in the temperature distribution causes an error in sensing the quantity of the intake air. Although this error is small comparing with that in the prior apparatuses, it is desirable to diminish the error further.

SUMMARY OF THE INVENTION

It is, therefore, an object of the present invention to provide an intake air quantity measuring apparatus which has a flow speed sensing resistor to form an appropriate temperature distribution irrespective of the speed or the quantity of the intake air and may produce an output signal representing quantity of the intake air.

It is another object of the present invention to provide an intake air quantity measuring apparatus which includes a flow speed sensing resistor to form a uniform temperature distribution at least in a direction perpendicular to the direction of an intake air flow.

It is a further object of the present invention to provide an intake air quantity measuring apparatus which has a flow speed sensing resistor with the end portions thereof connected to lead members and forms a uniform temperature distribution without being affected by those end portions.

In accomplishing these and other objects, an intake air quantity measuring apparatus includes a flat base plate which is disposed in an intake air duct with the flat surface of the base plate positioned in parallel with a flow direction of an intake air passing through the intake air duct, a flow speed sensing resistor which is deposited on the base plate and formed into an elongated film extending from a tip end of the base plate toward a base end thereof, and a pair of lead members deposited on the base plate. A first lead member of the lead members is extending from the base end of the base plate to the tip end thereof and electrically connected to a longitudinal tip end of the flow speed sensing resistor, and a second lead member is extending from the base end of the base plate in parallel spaced relationship with the first lead member and extending to a longitudinal base end of the flow speed sensing resistor and electrically connected thereto. The flow speed sensing resistor has an ohmic value varying in response to change in temperature of the resistor depending upon a flow speed of the intake air.

The intake air quantity measuring apparatus may be arranged to include a flat base plate which is disposed in an intake air duct with the flat surface of the base plate positioned in parallel with a flow direction of an intake air passing through the intake air duct, a flow speed sensing resistor which is deposited on the base plate and formed into a film having a cross-sectional area of a section at least a tip end portion of the film taken in a direction parallel to the air flow of the intake air smaller than a cross-sectional area of a central portion of the film, and a pair of lead members deposited on the base plate and electrically connected to the flow speed sensing resistor.

Further, the intake air quantity measuring apparatus may be arranged to include a flat base plate which is disposed in an intake air duct with the flat surface of the base plate positioned in parallel with a flow direction of an intake air passing through the intake air duct, a flow speed sensing resistor which is deposited on the base plate and formed into a film, a pair of lead members which is deposited on the base plate and electrically connected to the flow speed sensing resistor, and a thermal conductive layer which is deposited on the flow speed sensing resistor for covering at least a part of the resistor.

BRIEF DESCRIPTION OF THE DRAWINGS

The above stated objects and following description will become readily apparent with reference to the accompanying drawings, wherein like reference numerals denote like elements, and in which.

DESCRIPTION OF THE PREFERRED EMBODIMENTS

Figure 1:
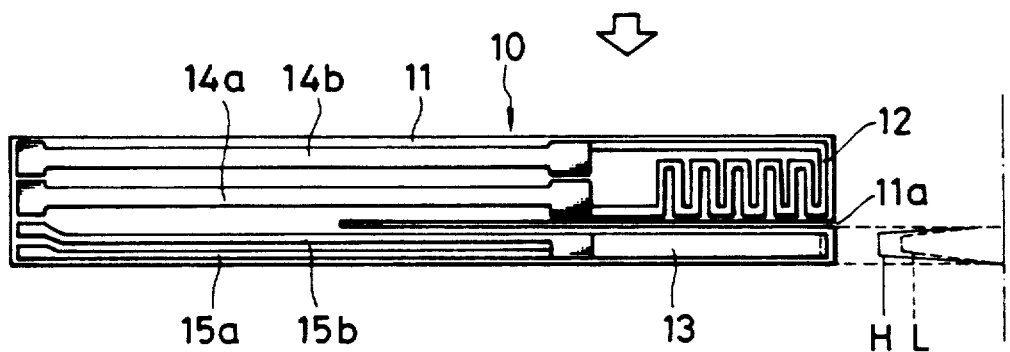
FIG. 1 is a front view of a first embodiment of a sensing element used for an intake air quantity measuring apparatus according to the present invention.
Figure 2:
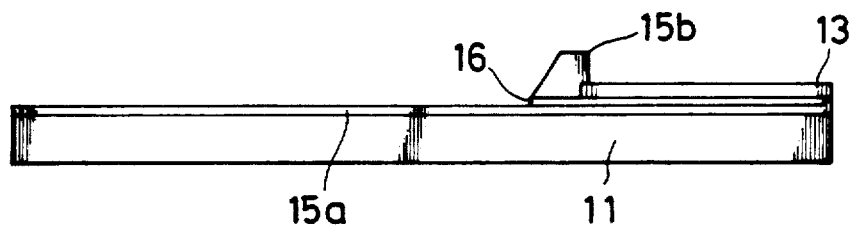
FIG. 2 is a side view of a first embodiment of a sensing element.

Referring to FIGS. 1 and 2, there is illustrated a sensing element 10 used for an embodiment of the present invention. A broad arrow in FIG. 1 indicates the direction of an intake air flow. The sensing element 10 has an intake air temperature sensing resistor 12 (hereinafter referred to as temperature sensing resistor 12) and a flow speed sensing resistor 13 (hereinafter referred to as speed sensing resistor 13) both of which are thin film heat sensing resistors fixed on the flat surface of a rectangular flat base plate 11. The base plate 11 is a flat zirconia plate with a slit 11a formed in the longitudinal direction on its flat surface. The base plate 11 is divided by the slit 11a into two sections, one section of which is broader in width than the other section. A thin film resistor of nickel, platinum or the like is deposited on the flat surface of the broader section by vapor deposition, firing or the like to form the temperature sensing resistor 12.

The temperature sensing resistor 12 is formed in series of a letter "S" connected to each other and its one end portion is bent to be positioned in parallel spaced relationship with the other end portion. A pair of lead members 14a, 14b are provided and electrically connected to each of the end portions of the temperature sensing resistor 12 respectively, and extend longitudinally to reach a base end of the base plate 11. The lead members 14a, 14b are made of gold for example, and deposited on the base plate 11 by means of vapor deposition, firing or the like.

On the flat surface of the other section of the base plate 11, there are provided a pair of lead members 15a, 15b extending longitudinally in parallel with each other. The lead members 15a, 15b are made of a pair of narrow conductors, for example gold wires. The lead member 15a is deposited on the surface of the base plate 11 from its base end to its tip end by means of the vapor deposition, firing or the like. On the lead member 15a, there is deposited an insulator member 16 such as silicon dioxide, on which the speed sensing resistor 13 is deposited. The speed sensing resistor 13 is a thin film resistor of platinum or the like forming a belt. The lead member 15a is electrically connected at its tip end to one longitudinal end of the speed sensing resistor 13. The lead member 15b is positioned in parallel spaced relationship with the lead member 15a, and deposited on the surface of the base plate 11 from its base end to the other longitudinal end of the speed sensing resistor 13, which end is electrically connected to the lead member 15b. Accordingly, the lead member 15a corresponds to the first lead member of the present invention, and the lead member 15b corresponds to the second lead member. On the surface of the temperature sensing resistor 12 and the speed sensing resistor 13, a glass protection film (not shown) is provided.

Each of the sensing resistors 12, 13 has a large temperature coefficient with a linear characteristic, and each ohmic value is determined to be $Rs << Rt$, in which Rs represents the ohmic value of the speed sensing resistor 13 and Rt represents that of the temperature sensing resistor 12. The slit 11a is formed to extend from the tip end of the base plate 11 to the portion where the temperature of the base plate 11 heated by the speed sensing resistor 13 is equal to the temperature of the intake air surrounding the base plate 11. In stead of the slit 11a, a plurality of holes or a groove may be made on the base plate 11. By the slit 11a, the holes or the groove, the heat transfer between the temperature sensing resistor 12 and the speed sensing resistor 13 is blocked.

Figure 3:
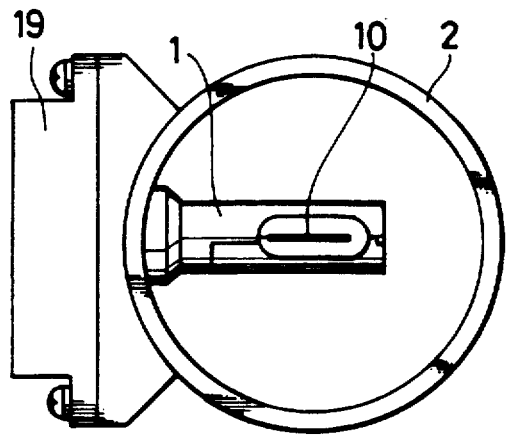
FIG. 3 is a plan view of an embodiment of the intake air quantity measuring apparatus fixed to an intake air duct according to the present invention.
Figure 4:
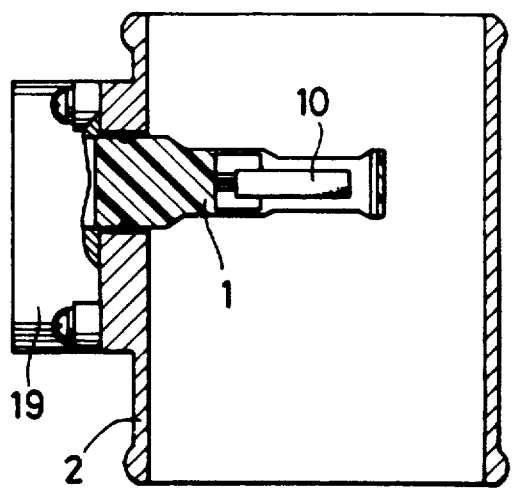
FIG. 4 is a sectional front view of the intake air quantity measuring apparatus shown in FIG. 3.

As shown in FIGS. 3 and 4, the sensing element 10 as structured above is mounted on a sensor holder 1 which is secured to an intake air duct 2 of an internal combustion engine (not shown) with the flat surface of the sensing element 10 positioned in parallel with the air flow of the intake air passing through the intake air duct 2. That is, both the temperature sensing resistor 12 and the speed sensing resistor 13 are disposed on a plane parallel with the air flow. Then, the sensing element 10 is electrically connected to a measuring unit in a case 19 through a plurality of leads (not shown) connected to the lead members 14a, 14b and 15a, 15b in FIG. 1 respectively. The measuring unit is provided with a bridge circuit including the temperature sensing resistor 12 and the speed sensing resistor 13. This bridge circuit is same as that disclosed in the Japanese Utility Model Laid-Open Publication No. 63-195229, so that description of the circuit is omitted.

The operation of the present embodiment will now be described. When the intake air is not introduced into the intake duct 2 in FIGS. 3 and 4, the bridge circuit is in equilibrium in the case where the temperature of the speed sensing resistor 13 is higher than that detected at the temperature sensing resistor 12 by a predetermined temperature difference $\Delta T$.

When the intake air is introduced into the intake air duct 2, the speed sensing resistor 13 is unable to maintain the temperature difference T due to heat transfer from the speed sensing resistor 13 to the intake air. Accordingly, in order to maintain the temperature difference $\Delta T$, the speed sensing resistor 13 must be supplied with current which is responsive to the speed of the intake air. Namely, the higher the speed of the intake air is, the more current is supplied. In other words, where the current supplied to the speed sensing resistor 13 for maintaining the temperature difference $\Delta T$ is increased, the speed of the intake air is high and therefore the air quantity is large. Accordingly, the output of the bridge circuit responds to the speed of the intake air, and therefore represents the quantity of the intake air.

Although the temperature of the speed sensing resistor 13 is maintained to be higher than that of the intake air by the predetermined temperature difference $\Delta T$, the heat transfer from the speed sensing resistor 13 to the temperature sensing resistor 12 and the vicinity of the base plate 11 is very small because of the slit 11a formed between the sensing resistors 12 and 13, so that the temperature sensing resistor 12 corresponds to the actual temperature of the intake air accurately. Further, since the temperature of the speed sensing resistor 13 is maintained constantly higher than the temperature of the intake air by the predetermined temperature difference $\Delta T$, even if the flow speed of the intake air changes, the heat transfer from the speed sensing resistor 13 to the intake air responds to the change in the flow speed of the intake air without any delay. The temperature distribution of the speed sensing resistor 13 on the base plate 11 in its lateral direction is not altered much by the change in the flow speed of the intake air, as shown at the right side in FIG. 1, so that the delay in detecting the flow speed of the intake air is avoided. One-dotted chain line extending vertically in FIG. 1 indicates the temperature of the intake air, and a solid line "H" indicates the lateral temperature distribution of the speed sensing resistor 13 when the flow speed of the intake air is high, whereas a phantom line "L" indicates the same when the flow speed is low.

Figure 5:
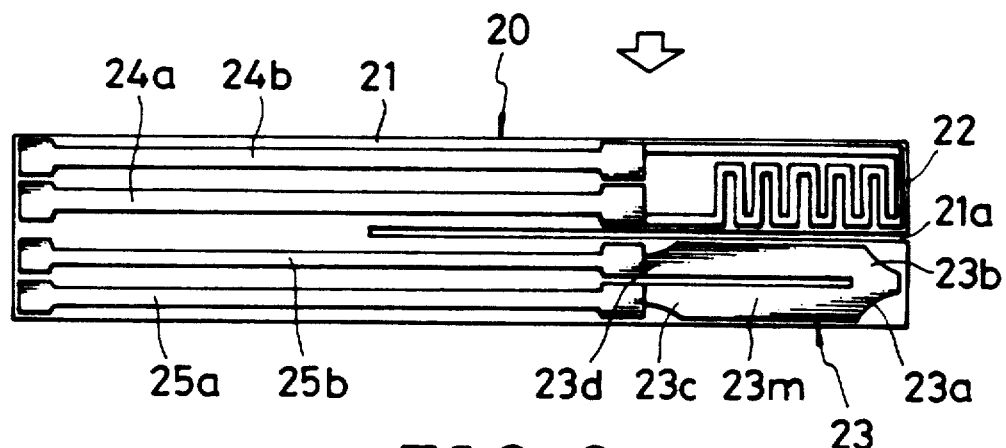
FIG. 5 is a front view of a second embodiment of the sensing element.

FIG. 5 shows a second embodiment of the sensing element, wherein a speed sensing resistor 23 and lead members 25a, 25b of a sensing element 20 are different in structure from the speed sensing resistor 13 and the lead members 15a, 15b of the first embodiment as shown in FIG. 1, and wherein a base plate 21 is different in size from the base plate 11 in FIG. 1. The temperature sensing resistor 22 and the lead members 24a, 24b are substantially same as the temperature sensing resistor 12 and the lead members 14a, 14b provided in the first embodiment in FIG. 1. In the following description, structural elements comparable with those described originally will be designated by corresponding last reference numerals with the different number of tens preceding them.

In the present embodiment, the speed sensing resistor 23 is a thin film resistor of platinum or the like which is formed into a letter "U" having a pair of straight portions of a same width in spaced parallel relationship with each other. The speed sensing resistor 23 is trimmed at each of corner portions 23a, 23b and open end portions 23c, 23d. Therefore, with respect to a cross-sectional area of a section taken in the direction parallel to the air flow of the intake air, that is, a section of the base plate 21 taken in its lateral direction, the cross-sectional area of the corner portions 23a, 23b at the tip end side of the base plate 21 is smaller than that of the central portion 23m of the straight portions of the base plate 21, and the cross-sectional area of the open end portions 23c, 23d is smaller than that of the central portion 23m as well. Consequently, the ohmic value of each of the corner portions 23a, 23b and the open end portions 23c, 23d is larger than that of the central portion 23m of the speed sensing resistor 23. A pair of lead members 25a, 25b are electrically connected to the open end portions 23c, 23d of the speed sensing resistor 23 respectively, and extend longitudinally to reach a base end of the base plate 21. The lead members 25a, 25b are made of gold or the like and deposited on the base plate 21 by means of vapor deposition, firing or the like. The sensing element 20 operates in substantially same manner as the sensing element 10 shown in FIG. 1. In the present embodiment, the temperature distribution of the speed sensing resistor 23 on the base plate 21 in the longitudinal direction thereof is maintained to be higher than the temperature of the intake air by the predetermined temperature difference ΔT uniformly from the central portion 23m of the base plate 21 to the corner portions 23a, 23b and open end portions 23c, 23d. Accordingly, the heat transfer from the speed sensing resistor 23 to the intake air responds to the change in the flow speed of the intake air, so that a good response is obtained.

Figure 6:
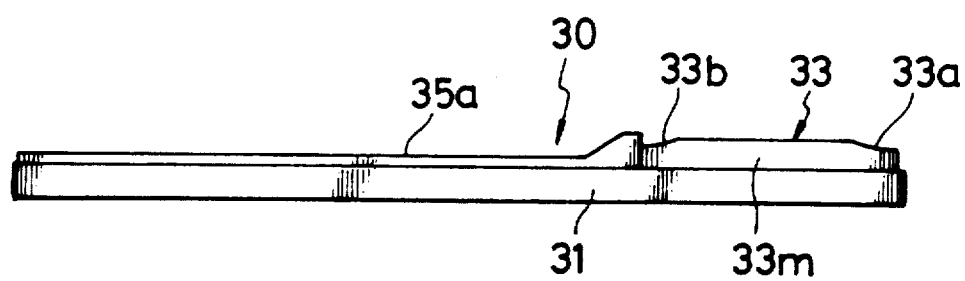
FIG. 6 is a side view of the sensing element of a third embodiment of the sensing element.
Figure 7:
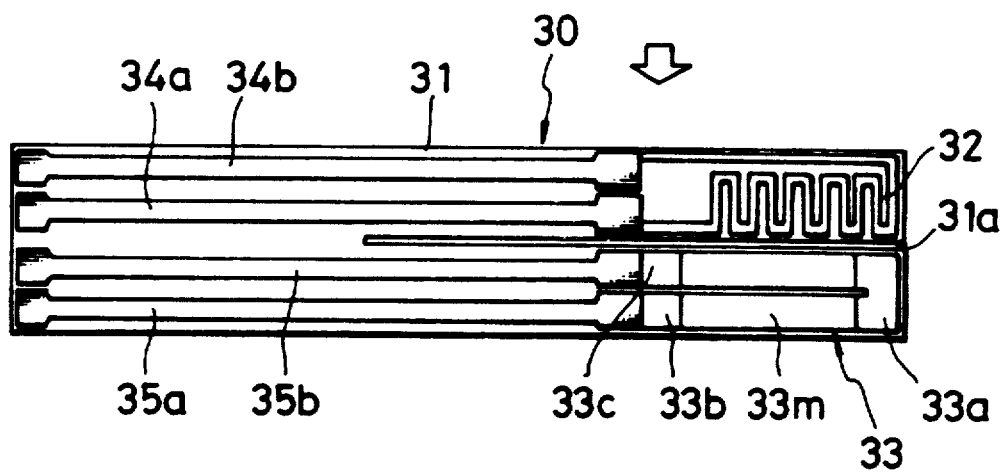
FIG. 7 is a front view of the sensing element shown in FIG. 6.

FIGS. 6 and 7 illustrate a third embodiment of the sensing element, wherein a speed sensing resistor 33 is different in structure from the speed sensing resistor 23 shown in FIG. 5. The remaining structure is substantially same as that of the sensing element 20 defined in FIG. 5. In a sensing element 30 of the present embodiment, the speed sensing resistor 33 is a thin film resistor formed into a letter "U", with thickness of a corner portion 33a and open end portions 33b, 33c decreased gradually from a central portion 33m of the resistor 33 toward the portions 33a, 33b and 33c as shown in FIG. 6. Consequently, the ohmic value of each of the corner portion 33a and the open end portions 33b, 33c is larger than that of the central portion 33m. In this embodiment, therefore, the temperature distribution of the speed sensing resistor 33 on the base plate 31 in the longitudinal direction thereof is maintained to be higher than the temperature of the intake air by the predetermined temperature difference ΔT uniformly from the central portion 33m to the corner portion 33a and the open end portions 33b, 33c.

Figure 8:
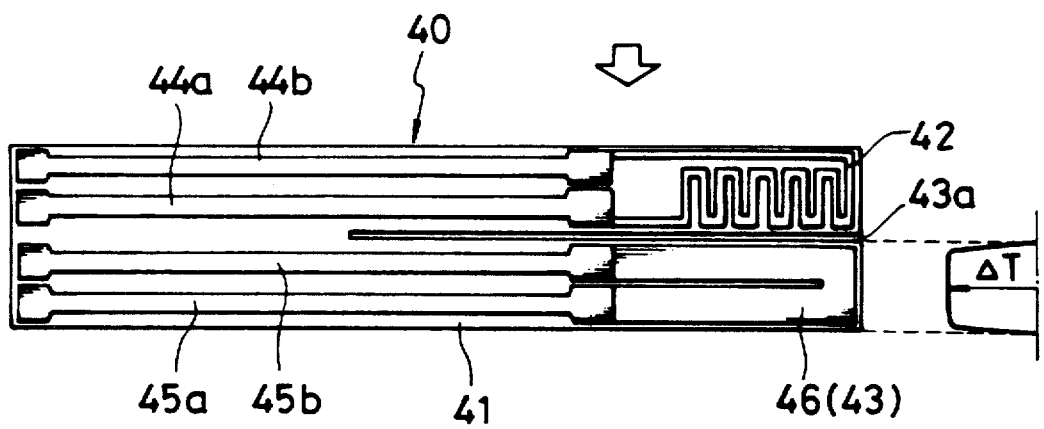
FIG. 8 is a front view of a fourth embodiment of the sensing element.
Figure 9:
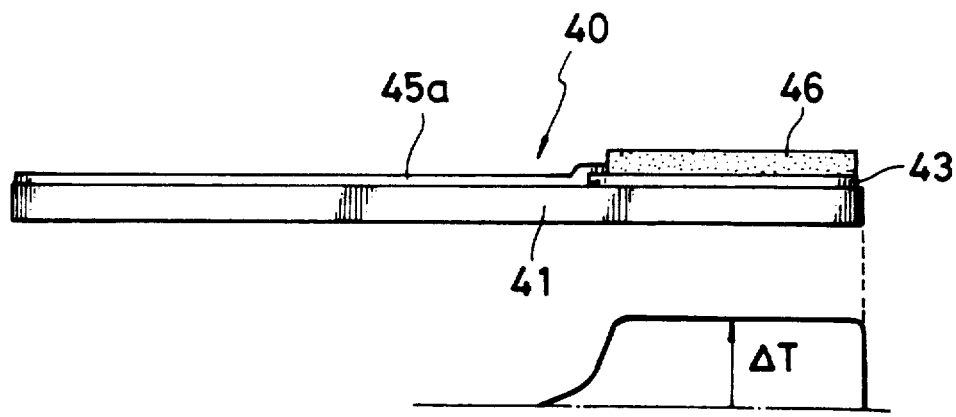
FIG. 9 is a side view of the sensing element shown in FIG. 8.

In FIGS. 8 and 9, there is illustrated a fourth embodiment of the sensing element. In a sensing element 40 of this embodiment, the speed sensing resistor 43 is a thin film resistor which is formed in a letter "U" and deposited on the flat surface of the tip end portion of the base plate 41. The sensing element 40 has a thermal conductive layer 46 which is deposited on the surface of the thin film resistor forming the speed sensing resistor 43, so that heat transfer is made uniformly from the thin film resistor. This thermal conductive layer 46 is formed of silicon or the like having a high thermal conductivity and deposited on the speed sensing resistor 43 in the course of a process for forming the speed sensing resistor 43 by means of spattering, vapor deposition, etching or the like. Consequently, the heat transfer to the intake air from the speed sensing resistor 43 is effectuated uniformly from the central portion thereof to the peripheral portion thereof. The remaining structure is substantially same as that of the sensing element 20 shown in FIG. 5.

In this embodiment, since the thermal conductive layer 46 is deposited on the speed sensing resistor 43, the temperature distribution of the speed sensing resistor 43 on the base plate 41 is maintained higher than the temperature of the intake air by the predetermined difference ΔT uniformly from the central portion of the base plate 41 to the peripheral portion thereof in both the lateral and longitudinal directions, as shown in FIGS. 8 and 9. One-dotted chain lines in FIGS. 8 and 9 indicate the temperature of the intake air, and solid lines indicate the temperature of a portion of the base plate 41 on which the speed sensing resistor 43 is deposited. Consequently, the heat transfer from the speed sensing resistor 43 to the intake air responds to the change in the flow speed of the intake air, so that a good response is obtained.

Figure 10:
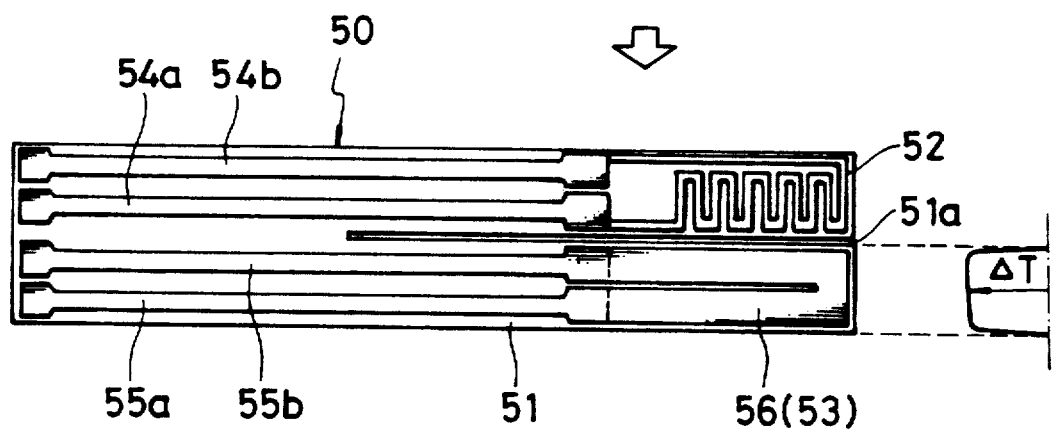
FIG. 10 is a front view of a fifth embodiment of the sensing element.
Figure 11:
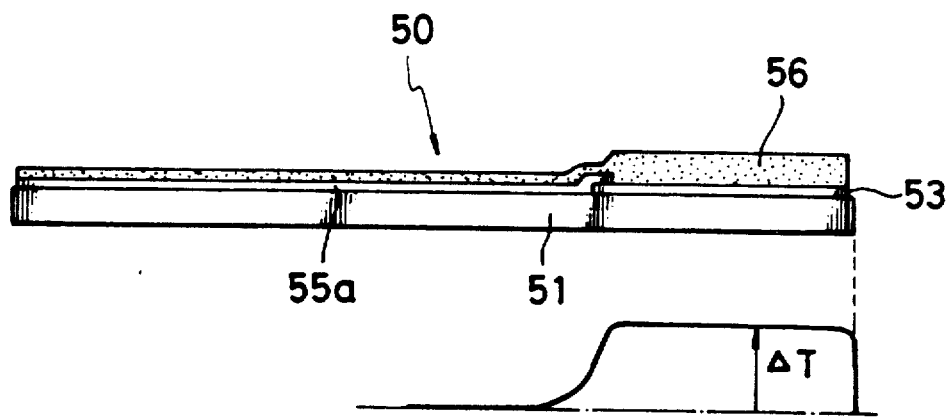
FIG. 11 is a side view of the sensing element shown in FIG. 10.

FIGS. 10 and 11 show a fifth embodiment of the sensing element, wherein a thermal conductive layer 56 is different in structure from the thermal conductive layer 46 shown in FIGS. 8 and 9. In a sensing element 50 of the present embodiment, the thermal conductive layer 56 extends over the lead members 55a, 55b, and functions also as a protective layer for all the surface of the sensing element 50. The thermal conductive layer 56 deposited on the speed sensing resistor 53 is set to be thicker than that deposited on the lead members 55a, 55b by more than two times of that, so that the heat transfer from the speed sensing resistor 53 is large. Accordingly, the heat transfer characteristic of the speed sensing resistor 53 to the intake air is similar to the characteristic shown in FIG. 8. Especially, a rapid decrease into the temperature of the intake air is obtained at the connecting portion between the speed sensing resistor 53 and the lead members 55a, 55b. The remaining structure of the present embodiment is same as that of the embodiment shown in FIGS. 8 and 9, so that description thereof is omitted. Consequently, a uniform temperature distribution of the speed sensing resistor 53 is obtained in both its lateral and longitudinal directions, as shown in FIGS. 10 and 11.

Figure 12:
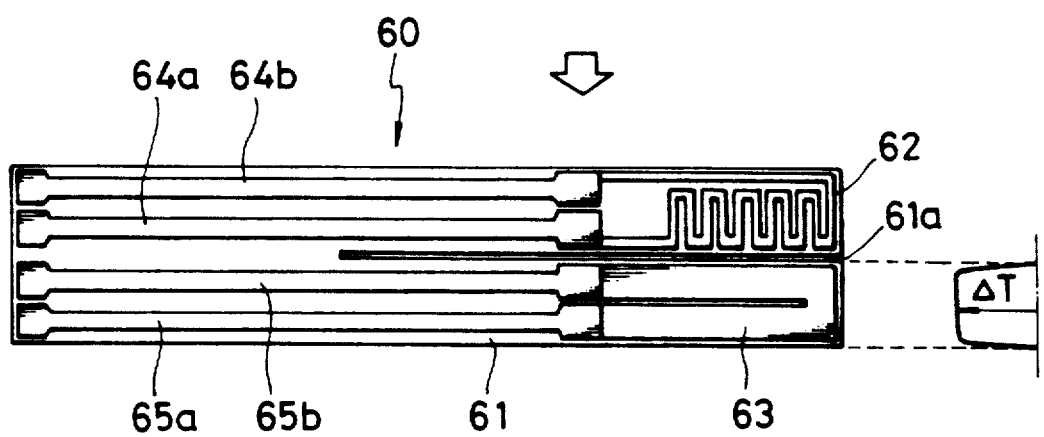
FIG. 12 is a front view of a sixth embodiment of the sensing element.
Figure 13:
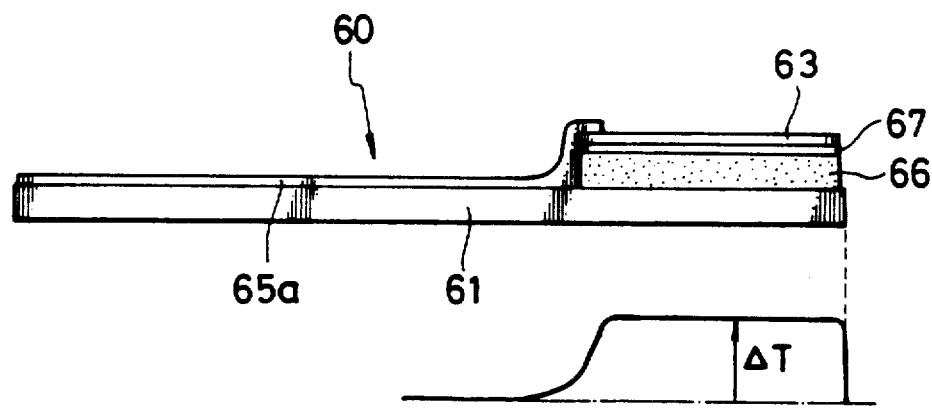
FIG. 13 is a side view of the sensing element shown in FIG. 12.
Figure 14:
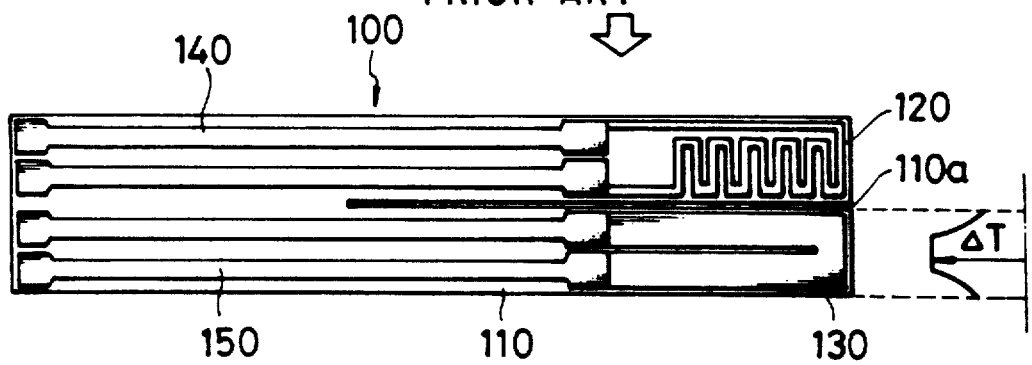
FIG. 14 is a front view of a sensing element proposed by one of the present applicants in a Japanese Patent Application which has not been disclosed to the public.
Figure 15:
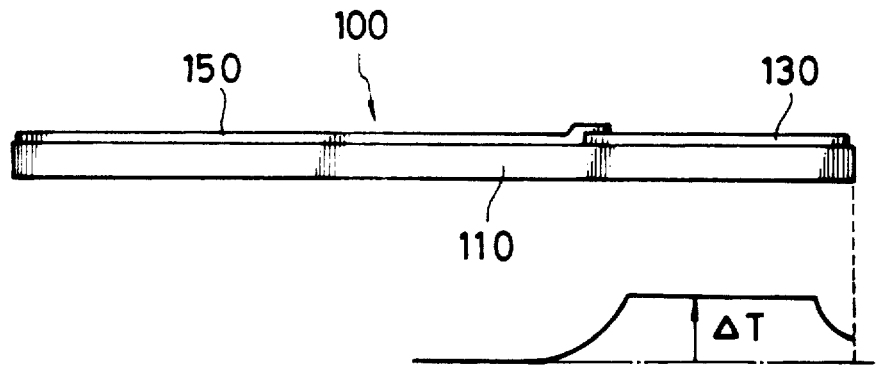
FIG. 15 is a side view of the sensing element shown in FIG. 14.
Figure 16:
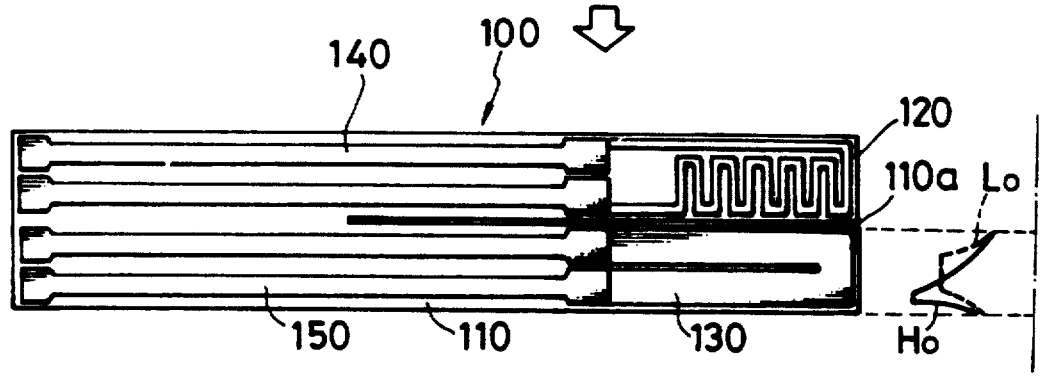
FIG. 16 is a front view of the sensing element same as in FIG. 14 for showing the temperature distribution in a lateral direction of a base plate when a flow speed of an intake air changes.

FIG. 12 and 13 show a sixth embodiment of the sensing element, wherein a thermal conductive layer 66 is deposited on the reverse side of the speed sensing resistor 63, that is, it is disposed between the base plate 61 and the speed sensing resistor 63, and wherein an insulator layer 67 is disposed between the speed sensing resistor 63 and the thermal conductive layer 66. As the thermal conductive layer 66, employed is a cupper layer, for example, which is thermally conductive and also electrically conductive. Therefore, the thermal conductive layer 66 is fixed to the speed sensing resistor 63 through the insulator layer 67. As the insulator layer 67, a silicon may be employed because its heat transfer characteristic is appropriate. These thermal conductive layer 66 and the insulator layer 67 are formed at the same time when the speed sensing resistor 63 is formed through spattering or vapor deposition, and etching etc.. The remaining structure of a sensing element 60 of the present embodiment is same as that of the embodiment shown in FIGS. 8 and 9, so that description thereof is omitted. Consequently, in this embodiment, an appropriate temperature distribution on the base plate 61 is obtained as shown in FIGS. 12 and 13. Further, the embodiment shown in FIGS. 12 and 13 may incorporate the features in the embodiments shown in FIGS. 8 to 11. Both of the thermal conductive layer 66 and insulator layer 67 may be disposed on both sides of the speed sensing resistor 63 in FIGS. 12, 13.

It should be apparent to one skilled in the art that the above-described embodiment is merely illustrative of but a few of the many possible specific embodiments of the present invention. For example, in the above-described embodiments, the speed sensing resistor of the self-heating type is employed, whereas that of so-called indirect heating type with a heating resistor disposed in its vicinity may be employed. Numerous and various other arrangements can be readily devised by those skilled in the art without departing from the spirit and scope of the invention as defined in the following claims.

What is claimed is:

1. An apparatus for measuring intake air quantity comprising:

a flat base plate disposed in an intake air duct with the flat surface of said base plate positioned in parallel with a flow direction of an intake air passing through said intake air duct;

a flow speed sensing resistor deposited on said base plate and formed into a film, said flow speed sensing resistor having an ohmic value varying in response to change in temperature of said resistor depending upon a flow speed of said intake air;

a pair of lead members deposited on said base plate and electrically connected to said flow speed sensing resistor; and a layer of high thermal conductivity deposited on said flow speed sensing resistor for covering at least a part thereof wherein, said thermal conductive layer si provided between said flow speed sensing resistor and said base plate and in contact with said base plate.

* * * * *